US 6,710,568 B2

(12) United States Patent
Fujii (10) Patent No.: US 6,710,568 B2
(45) Date of Patent: Mar. 23, 2004

(54) MOTOR DRIVE DEVICE (75) Inventor: Norio Fujii, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/043,310

(22) Filed: Jan. 14, 2002

(65) Prior Publication Data

US 2002/0093304 A1 Jul. 18, 2002

(30) Foreign Application Priority Data

Jan. 15, 2001 (JP) ........................................ 2001-005961

(51) Int. Cl.$^7$ ............................. G05B 11/28; H02P 7/36
(52) U.S. Cl. ..................... 318/599; 318/811; 318/801; 318/810; 318/812; 318/808
(58) Field of Search ................. 318/599, 811, 318/800, 801, 810, 807, 808, 727, 805, 812

(56) References Cited

U.S. PATENT DOCUMENTS

| | | | | |
|---|---|---|---|---|
| 4,295,189 A | * | 10/1981 | Boys | 363/41 |
| 4,611,158 A | * | 9/1986 | Nagase et al. | 318/803 |
| 4,962,976 A | * | 10/1990 | Takahashi et al. | 318/811 |
| 5,001,407 A | * | 3/1991 | Suzuki et al. | 318/268 |
| 5,068,777 A | * | 11/1991 | Ito | 363/97 |
| 5,361,196 A | * | 11/1994 | Tanamachi et al. | 363/41 |
| 5,793,170 A | * | 8/1998 | Nakai | 318/254 |
| 5,869,946 A | * | 2/1999 | Carobolante | 318/811 |
| 6,023,417 A | * | 2/2000 | Hava et al. | 363/41 |
| 6,166,507 A | * | 12/2000 | Uegami | 318/603 |
| 6,323,612 B1 | * | 11/2001 | Miyagoe | 318/432 |
| 6,380,709 B2 | * | 4/2002 | Nishimura et al. | 318/811 |
| 6,476,577 B1 | * | 11/2002 | Gluch | 318/631 |
| 6,504,334 B2 | * | 1/2003 | Sogawa | 318/599 |
| 2002/0089299 A1 | * | 7/2002 | Nishimura et al. | 318/599 |

FOREIGN PATENT DOCUMENTS

| | | | | | |
|---|---|---|---|---|---|
| JP | 58089091 A | * | 5/1983 | | H02P/5/34 |
| JP | 60091889 A | * | 5/1985 | | H02P/5/41 |
| JP | 60091898 A | * | 5/1985 | | H02P/7/63 |

* cited by examiner

Primary Examiner—Robert Nappi
Assistant Examiner—Patrick Miller
(74) Attorney, Agent, or Firm—Morgan, Lewis & Bockius LLP (57) ABSTRACT

A motor drive device of the invention has means for producing a pulse signal having a fixed amplitude by comparing a drive signal that is a sinusoidal signal synchronous with the rotation of a motor with a predetermined high-frequency signal, and the switching of a switching device connected between a power source and the motor is controlled by the pulse signal. This prevents the lowering of the switching speed of the switching device connected between the power source and the motor near the zero-cross points of the sinusoidal drive signal. This helps minimize switching loss and enhance power efficiency. Moreover, the phase current that flows through the motor comes to have a sinusoidal waveform. This helps enhance rotation characteristics.

3 Claims, 9 Drawing Sheets

MOTOR DRIVE DEVICE

BACKGROUND OF THE INVENTION

1. Field of the Invention

The present invention relates to a motor drive device that controls the total current that flows through a motor by controlling the duty factor of the on/off periods of a switching device connected between a power source and the motor.

2. Description of the Prior Art

A conventional example of the configuration of a motor drive device as described above is shown in FIG. 8. From unillustrated hole devices fitted around the rotor, i.e. the rotary portion, of a motor M, hole signals H1, H2, and H3 are fed respectively to between external terminals IN1 and IN2, between external terminals IN3 and IN4, and between external terminals IN5 and IN6. These hole signals H1, H2, and H3 are amplified respectively by hole amplifiers 1-1, 1-2, and 1-3, and are then fed to a signal synthesizer circuit 2'.

Figure 8:
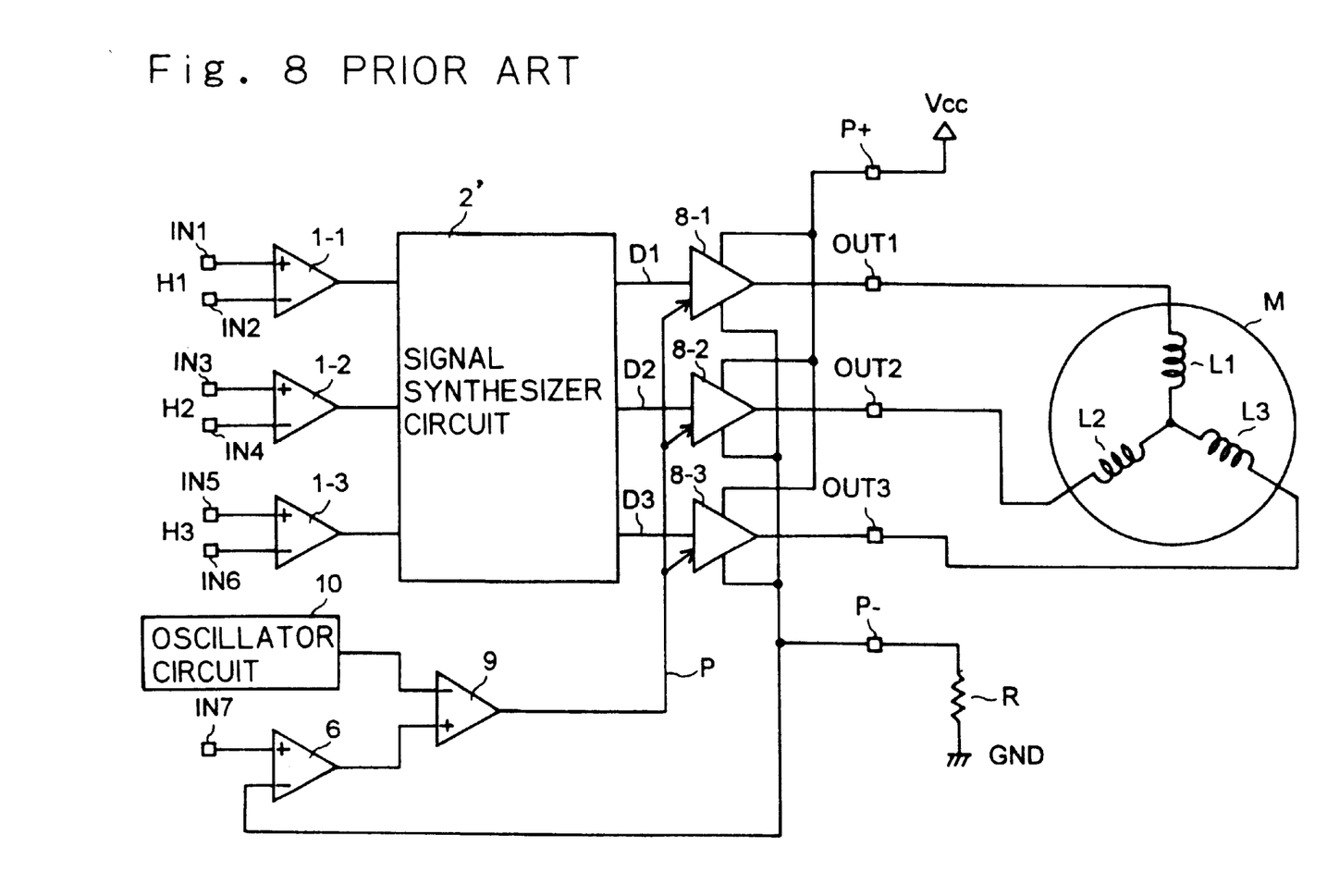
FIG. 8 is a block diagram of a conventional motor drive device.

The hole signals H1, H2, and H3 respectively represent the positional relationship between the coils L1, L2, and L3 and the rotor of the motor M, and are each a sinusoidal signal synchronous with the rotation of the motor M. Moreover, the three hole signals H1, H2, and H3 are 120° out of phase with one another.

On the basis of the signals output from the hole amplifiers 1-1, 1-2, and 1-3, the signal synthesizer circuit 2' produces and outputs sinusoidal drive signals D1, D2, and D3 each having a phase 30° leading the phase of the corresponding one of the hole signals output from the hole amplifiers 1-1, 1-2, and 1-3.

Figure 9:
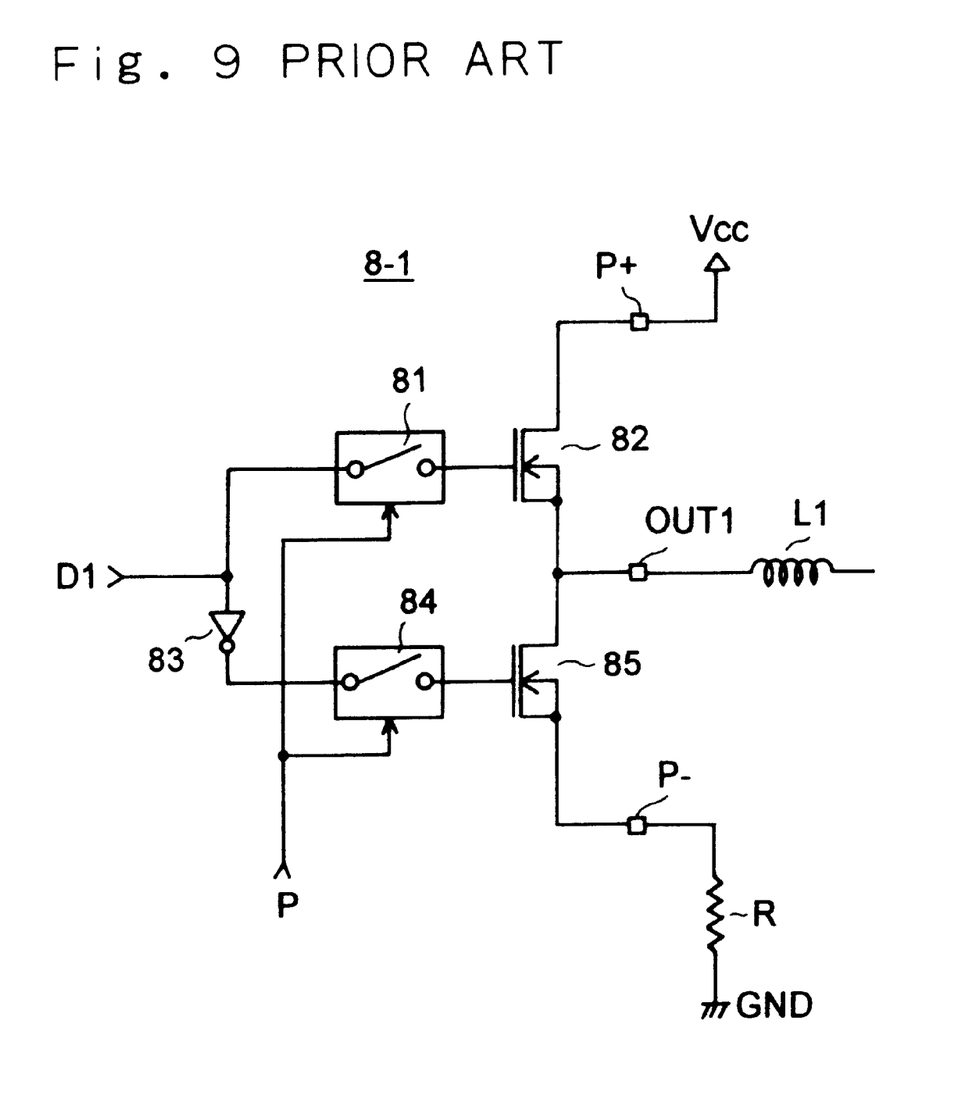
FIG. 9 is a diagram showing the configuration of the output circuits in FIG. 8.

The drive signals D1, D2, and D3 output from the signal synthesizer circuit 2' are fed respectively to output circuits 8-1, 8-2, and 8-3. The configuration of the output circuit 8-1 is shown in FIG. 9. The drive signal D1 fed from the signal synthesizer circuit 2' is, on the one hand, fed through a switch 81 to the gate of an upper transistor (an n-channel MOS-type FET connected between external terminals P+ and OUT1) 82 and, on the other hand, inverted by an inverter circuit 83 and then fed through a switch 84 to the gate of a lower transistor (an n-channel MOS-type FET connected between external terminals P− and OUT1) 85. The switches 81 and 84 are each so configured as to be turned on when the pulse signal P output from the comparator 9, described later, is at a high level and off when the pulse signal P is at a low level.

The output circuits 8-2 and 8-3 are configured in the same manner as the output circuit 8-1, except that the node between the upper and lower transistors 82 and 85 is connected to an external terminal OUT2 in the output circuit 8-2 and to an external terminal OUT3 in the output circuit 8-3.

The external terminals OUT1, OUT2, and OUT3 are connected respectively to one end of the coils L1, L2, and L3 of the motor M. The coils L1, L2, and L3 are connected together at the other end. To the external terminal P+, a supply voltage $V_{cc}$ is applied. The external terminal P− is connected through an externally fitted resistor R to ground GND. The total current that flows from the supply voltage $V_{cc}$ into the motor M flows through the resistor R (of which the resistance is 1 [Ω] or lower) to ground GND.

A current detector circuit 6 amplifies the difference between a current specifying voltage fed in via an external terminal IN7 and the voltage (hereinafter the detected voltage) appearing across the resistor R according to the total current that flows through the motor M, and outputs the amplified difference. A comparator 9 compares the level of the signal output from the current detector circuit 6 with the level of a triangular wave output from an oscillator circuit 10, and outputs a pulse signal P that represents the result of comparison. The higher (or lower) the current specifying voltage fed in via the external terminal IN7 is relative to the detected voltage, the higher (or lower) the duty factor of the high-level periods of the pulse signal P output from the comparator 9.

The configuration described above makes it possible to control the duty factor of the on/off periods of the transistors 82 and 85 constituting the output circuits 8-1, 8-2, and 8-3 in such a way as to keep the current specifying voltage and the detected voltage equal. Thus, the total current that flows through the motor M is stabilized at the level specified by the current specifying voltage.

However, in the motor drive device described above, the switching devices connected between the power source and the motor are controlled by signals obtained by chopping sinusoidal signals with a pulse signal. As a result, the switching speed lowers near the zero-cross points of the sinusoidal signals, leading to a greater switching loss and thus lower power efficiency.

Moreover, the duty factor of the on/off periods of the switching devices connected between the power source and the motor varies only according to the error, from the specified level, of the total current that flows through the motor. Thus, distortion is inevitable in the waveform of the phase current that flows through the motor, resulting in unsatisfactory rotation characteristics such as torque ripples, wow and flutter, and rotation noise.

SUMMARY OF THE INVENTION

An object of the present invention is to provide a motor drive device that controls the total current that flows through a motor by controlling the duty factor of the on/off periods of a switching device connected between a power source and the motor and that offers improved power efficiency and rotation characteristics.

To achieve the above object, according to the present invention, a motor drive device is provided with means for producing a pulse signal having a fixed amplitude by comparing a drive signal that is a sinusoidal signal synchronous with the rotation of a motor with a predetermined high-frequency signal, and the switching of a switching device connected between a power source and the motor is controlled by the pulse signal.

This configuration prevents the lowering of the switching speed of the switching device connected between the power source and the motor near the zero-cross points of the sinusoidal drive signal. This helps minimize switching loss and enhance power efficiency. Moreover, the phase current that flows through the motor comes to have a sinusoidal waveform. This helps enhance rotation characteristics.

The motor drive device may be further provided with means for controlling the amplitude of the high-frequency signal according to a current specifying signal that indicates the level of current to be passed through the motor. The motor drive device may be further provided with a hole amplifier for amplifying the hole signal output from a hole device fitted around the rotor constituting the rotary portion of the motor, a signal synthesizer circuit for producing the drive signal on the basis of the hole signal amplified by the hole amplifier, and means for controlling the gain of the hole amplifier or of the signal synthesizer circuit according to a current specifying signal that indicates the level of current to be passed through the motor.

These configurations make it possible to vary the relationship between the amplitudes of the drive signal and the high-frequency signal on the basis of the current specifying signal. Since the maximum duty factor of the pulse signal varies according to this relationship, it is thus possible to adjust the total current that flows through the motor.

In a case where, as described above, the relationship between the amplitudes of the drive signal and the high-frequency signal is varied, it is preferable to further provide means for exercising control so that the amplitude of the high-frequency signal does not become smaller than the amplitude of the drive signal.

This configuration prevents the problem in which the switching device connected between the power source and the motor remains on in periods in which it should perform switching, with the result that the phase current that flows through the motor comes to have a stepped waveform, degrading rotation characteristics.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
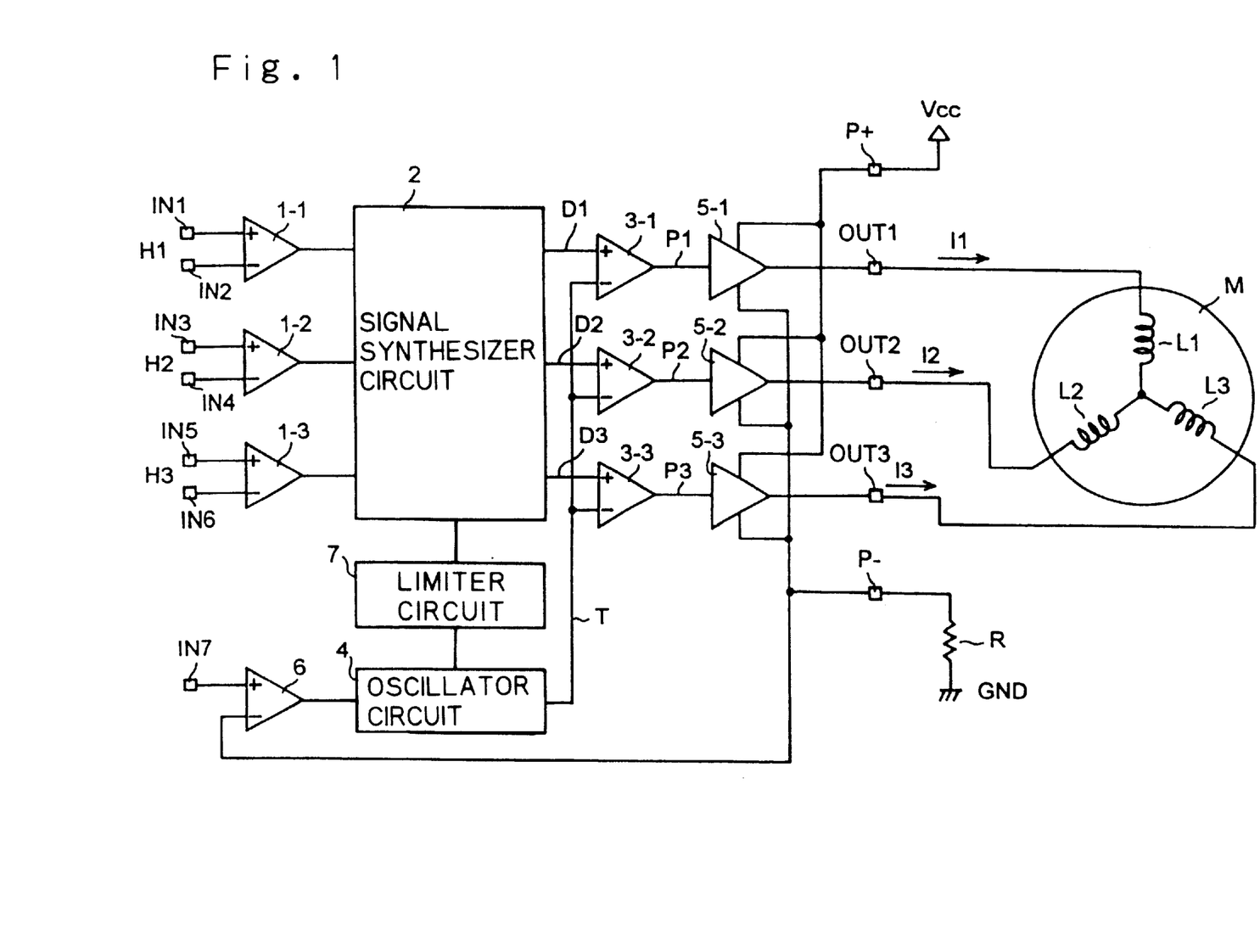
FIG. 1 is a block diagram of a motor drive device embodying the invention.

Hereinafter, embodiments of the present invention will be described with reference to the drawings. FIG. 1 shows a block diagram of a motor drive device embodying the invention. Here, such circuit elements as are found also in FIG. 8, described as a conventional example, are identified with the same reference numerals, and their explanations will not be repeated.

On the basis of the signals output from the hole amplifiers 1-1, 1-2, and 1-3, the signal synthesizer circuit 2 produces and outputs sinusoidal drive signals D1, D2, and D3 each having a phase 30° leading the phase of the corresponding one of the hole signals output from the hole amplifiers 1-1, 1-2, and 1-3.

Comparators 3-1, 3-2, and 3-3 compare the drive signals D1, D2, and D3 respectively with a triangular wave T output from an oscillator circuit 4, and output pulse signals P1, P2, and P3 representing the results of comparison. The pulse signals P1, P2, and P3 output from the comparators 3-1, 3-2, and 3-3 are at a high or low level according to whether the corresponding drive signals D1, D2, and D3 are higher or lower, respectively, than the triangular wave T.

As will be described later, the amplitude of the triangular wave T output from the oscillator circuit 4 is so controlled as to vary according to the signal output from a current detector circuit 6. Moreover, the frequency of the triangular wave T output from the oscillator circuit 4 is set to be far higher than the frequency of the drive signals D1, D2, and D3 output from the signal synthesizer circuit 2.

Figure 2:
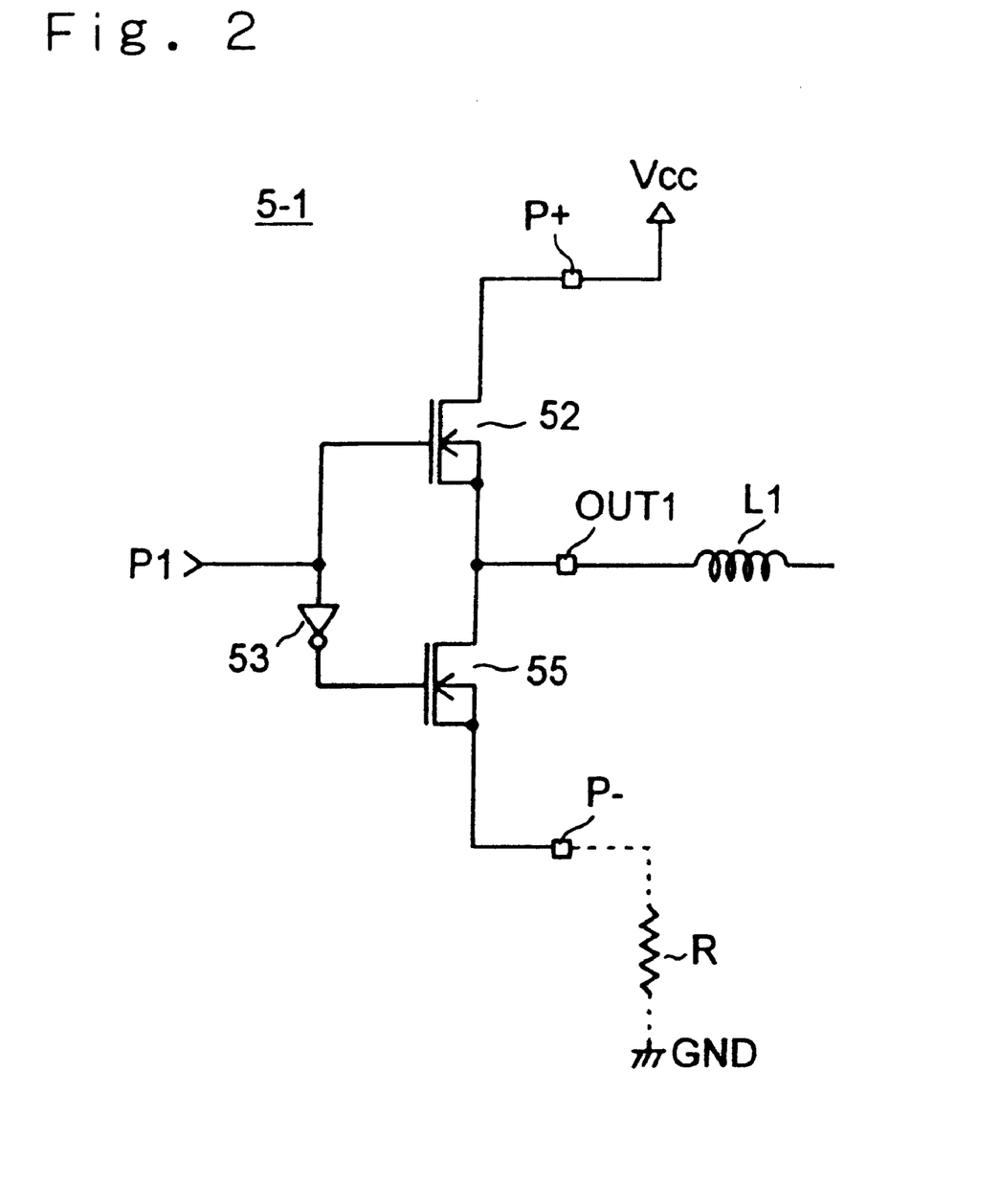
FIG. 2 is a diagram showing the configuration of the output circuits in FIG. 1.

The pulse signals P1, P2, and P3 output from the comparators 3-1, 3-2, and 3-3 are fed respectively to output circuits 5-1, 5-2, and 5-3. The configuration of the output circuit 5-1 is shown in FIG. 2. The pulse signal P1 fed from the comparator 3-1 is, on the one hand, fed to the gate of an upper transistor (an n-channel MOS-type FET connected between external terminals P+ and OUT1) 52 and, on the other hand, inverted by an inverter circuit 53 and then fed to the gate of a lower transistor (an n-channel MOS-type FET connected between external terminals P− and OUT1) 55.

The output circuits 5-2 and 5-3 are configured in the same manner as the output circuit 5-1, except that the node between the upper and lower transistors 52 and 55 is connected to an external terminal OUT2 in the output circuit 5-2 and to an external terminal OUT3 in the output circuit 5-3.

Thus, in each of the output circuits 5-1, 5-2, and 5-3, in a period in which the corresponding pulse signal P1, P2, or P3 is at a high level, the upper transistor 52 is on and the lower transistor 55 is off, making a current flow out of the output circuit 5-1, 5-2, or 5-3 into the corresponding coil L1, L2, or L3; on the other hand, in a period in which the corresponding pulse signal P1, P2, or P3 is at a low level, the upper transistor 52 is off and the lower transistor 55 is on, making a current flow out of the corresponding coil L1, L2, or L3 into the output circuit 5-1, 5-2, or 5-3. That is, a current flows in the direction from the coil connected to the output circuit whose upper transistor is on to the coil connected to the output circuit whose lower transistor is on.

The current detector circuit 6 amplifies the difference between a current specifying voltage fed in via an external terminal IN7 and the detected voltage (the voltage appearing across the resistor R according to the total current that flows through the motor M), and outputs the amplified difference. The amplitude of the triangular wave output from the oscillator circuit 4 is so controlled as to vary according to the signal output from the current detector circuit 6; specifically, the higher the current specifying voltage fed in via the external terminal IN7 is relative to the detected voltage, the smaller the amplitude of the triangular wave. In addition, a limiter circuit 7 limits the amplitude of the triangular wave T output from the oscillator circuit 4 in such a way that it does not become smaller than the amplitude of the drive signals D1, D2, and D3 output from the signal synthesizer circuit 2.

Figure 3:
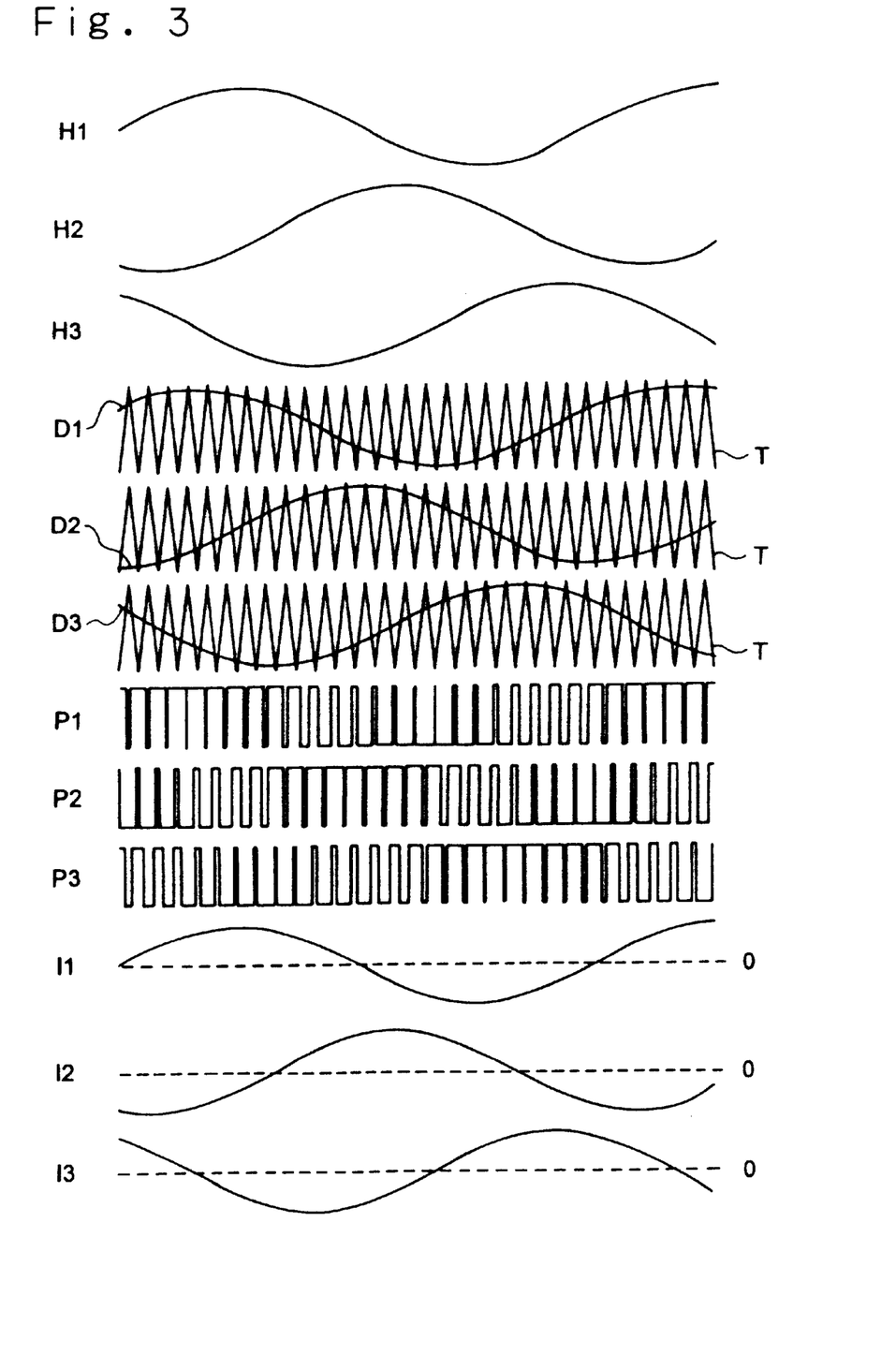
FIG. 3 is a diagram showing the signal waveforms observed at relevant points in FIG. 1.

In this configuration, the signals at relevant points have waveforms as shown in FIG. 3. Specifically, the switching of the transistors 52 and 55 (the switching devices connected between the power source and the motor) constituting the output circuits 5-1, 5-2, and 5-3 is controlled respectively by the pulse signals P1, P2, and P3, each having a substantially fixed amplitude. Thus, even at the zero-cross points of the drive signals D1, D2, and D3, the switching speed does not lower. In this way, it is possible to minimize switching loss and enhance power efficiency. It is to be noted that, in FIG. 3, to ease understanding, the triangular wave T is shown to have far fewer waves than it actually has; in reality, a single period of the drive signals D1, D2, and D3 is compared with several thousand waves in the triangular wave T (in other words, the triangular wave T has several thousand times the frequency of the drive signals D1, D2, and D3).

With respect to the pulse signals P1, P2, and P3 by which the switching of the transistors 52 and 55 constituting the output circuits 5-1, 5-2, and 5-3 is controlled respectively, the duty factor of the high-level periods becomes higher as the sinusoidal drive signals D1, D2, and D3 become closer to their maximum peak, and the duty factor of the low-level periods becomes higher as the sinusoidal drive signals D1, D2, and D3 become closer to their minimum peak. Thus, the phase current I1, I2, and I3 that flows through the coils L1, L2, and L3 of the motor M comes to have a sinusoidal waveform. This helps improve rotation characteristics such as torque ripples, wow and flutter, and rotation noise.

Figure 4:
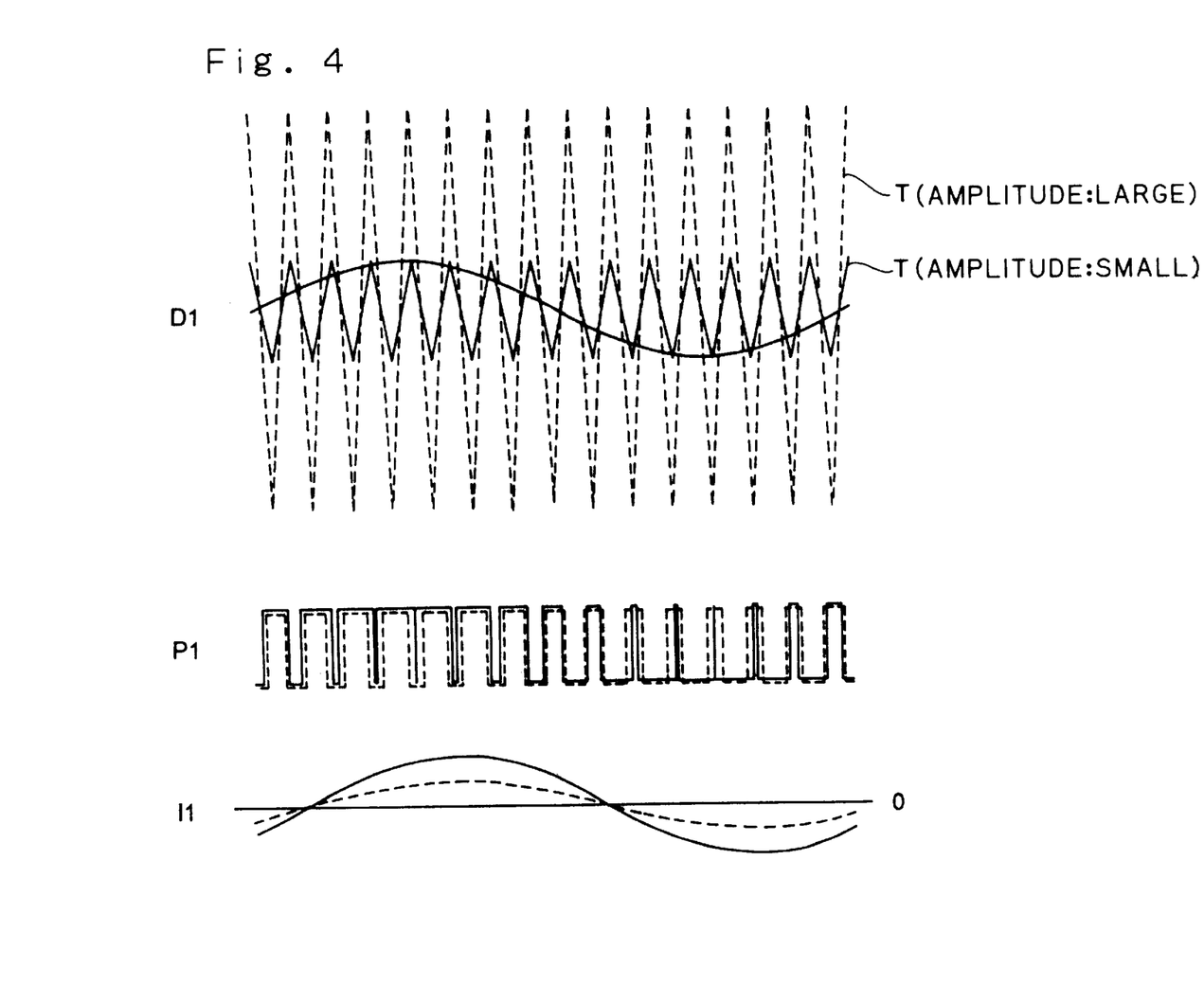
FIG. 4 is a diagram showing how the phase current flowing through the motor becomes larger as the amplitude of the triangular wave output from the oscillator circuit becomes smaller in FIG. 1.

FIG. 4 shows the relationship between the drive signal D1 and the triangular wave T, with solid lines representing the waveforms observed when the amplitude of the triangular wave T output from the oscillator circuit 4 is small and broken lines representing the waveforms observed when its amplitude is large. As shown in FIG. 4, the smaller the amplitude of the triangular wave T output from the oscillator circuit 4, the higher the maximum duty factor of the high-level and low-level periods of, for example, the pulse signal P1 output from the comparator 3-1, and thus the larger the phase current that flows through the coil L1 of the motor M. As a result, since, as described earlier, the amplitude of the triangular wave T becomes smaller as the current specifying voltage fed in via the external terminal IN7 becomes higher relative to the detected voltage, the total current that flows through the motor M is stabilized at the level specified by the current specifying voltage.

Figure 5:
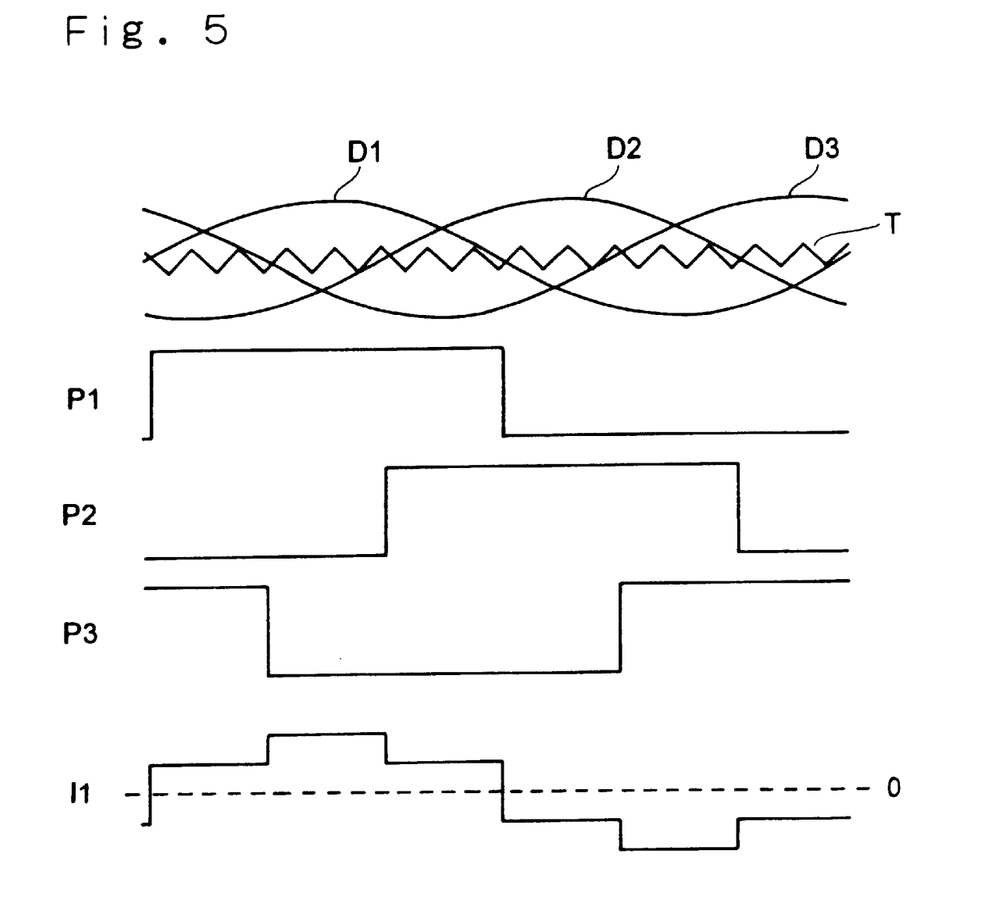
FIG. 5 is a diagram showing how the phase current flowing through the motor comes to have a stepped waveform when the amplitude of the triangular wave output from the oscillator circuit becomes smaller than the amplitude of the drive signals output from the signal synthesizer circuit.

As shown in FIG. 5, when the amplitude of the triangular wave T output from the oscillator circuit 4 becomes smaller than the amplitude of the drive signals D1, D2, and D3 output from the signal synthesizer circuit 2, the pulse signals P1, P2, and P3 output from the comparators 3-1, 3-2, and 3-3 are kept substantially constant at a high level in periods in which the drive signal D1 is positive and at a low level in periods in which it is negative. This causes the transistors 52 and 55 of the output circuits 5-1, 5-2, and 5-3 to remain on in periods in which they should perform switching, and thus causes the phase current that flows through the motor M to have a stepped waveform, degrading rotation characteristics.

In this embodiment, the limiter circuit 7 limits the amplitude of the triangular wave T output from the oscillator circuit 4 in such a way that it does not become smaller than the amplitude of the drive signals D1, D2, and D3 output from the signal synthesizer circuit 2, and thereby prevents degradation of rotation characteristics as mentioned above.

Figure 6:
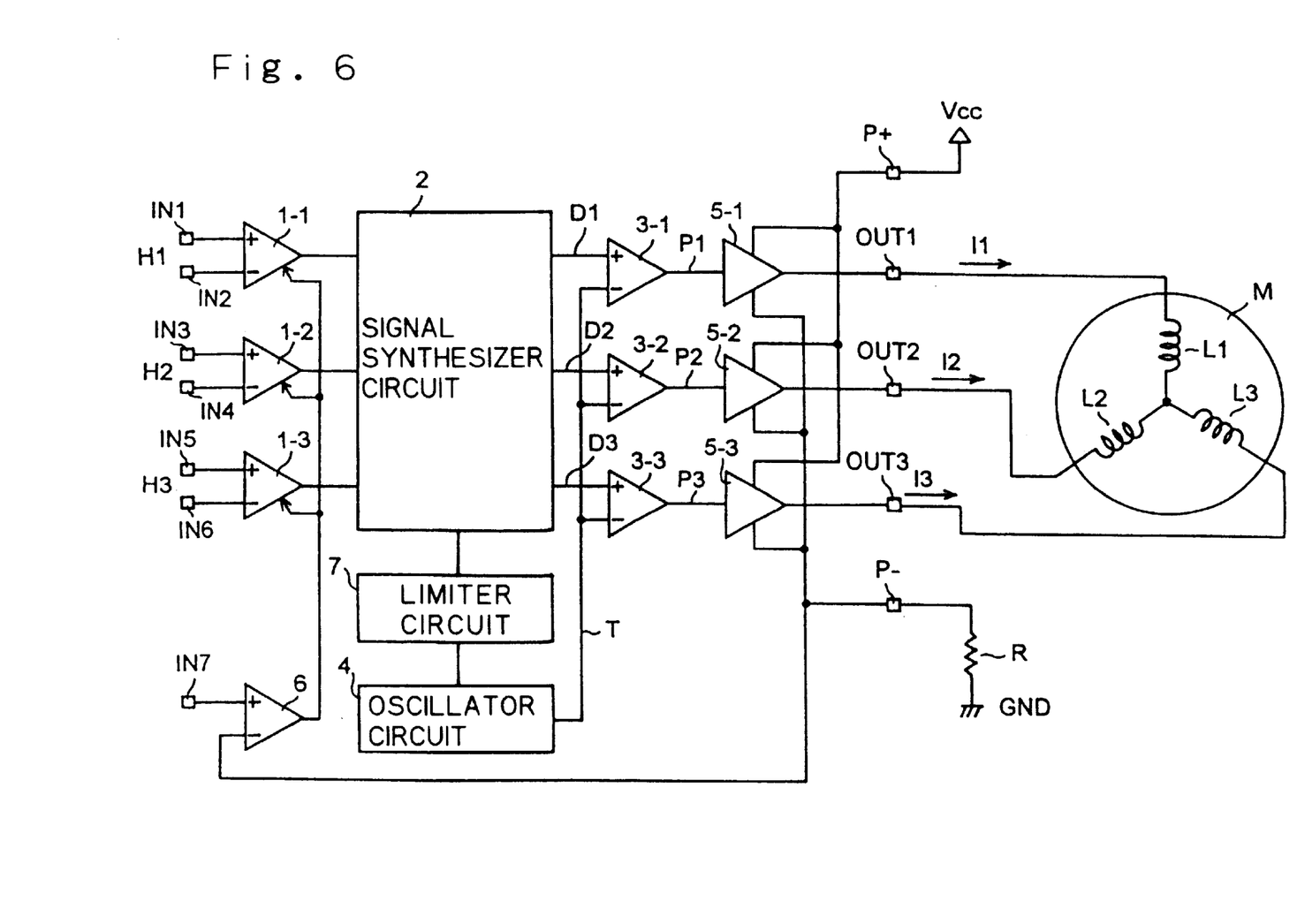
FIG. 6 is a block diagram of another motor drive device embodying the invention.
Figure 7:
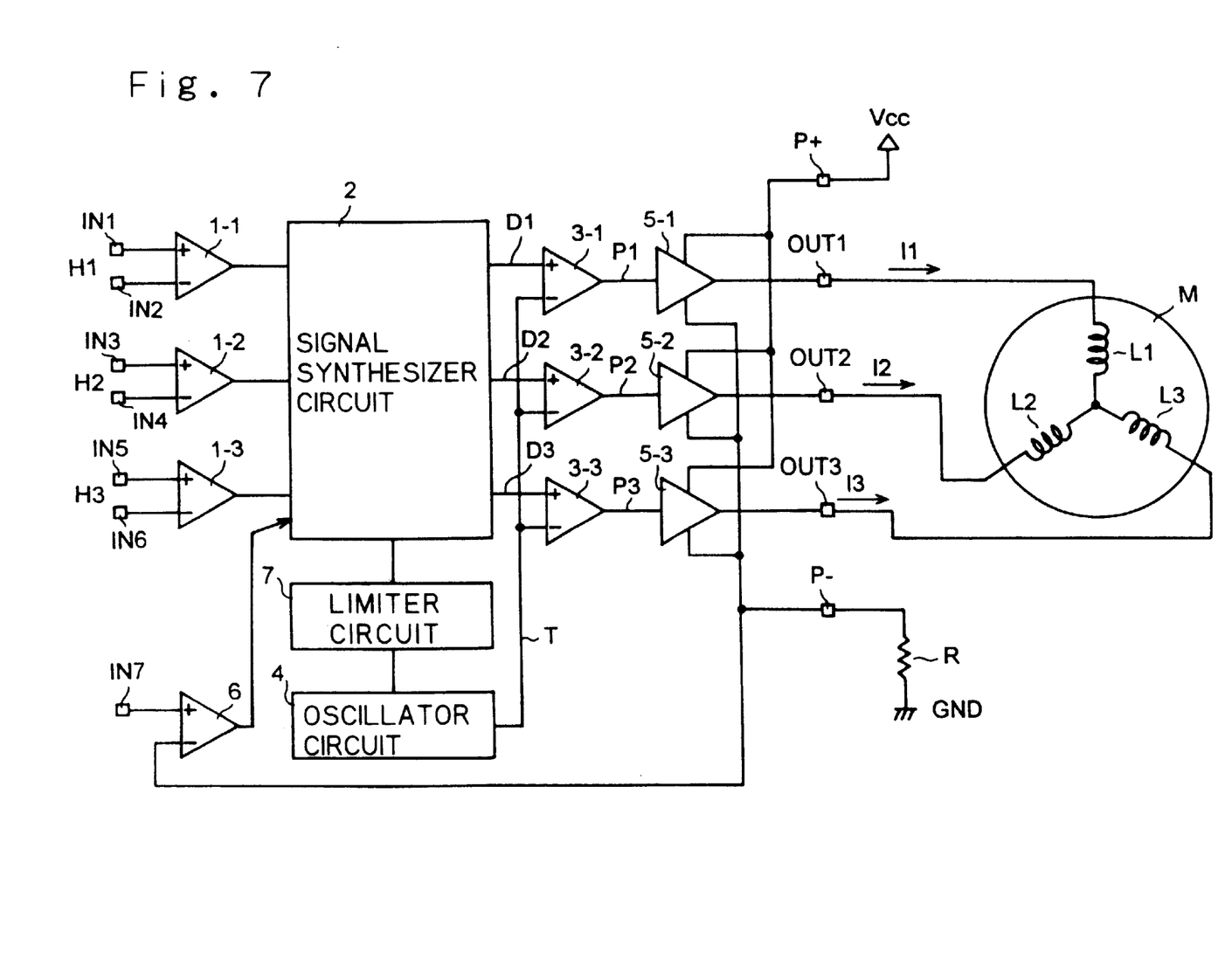
FIG. 7 is a block diagram of a still another motor drive device embodying the invention.

In this embodiment, the total current that flows through the motor M is controlled by controlling the amplitude of the triangular wave T output from the oscillator circuit 4 with the signal output from the current detector circuit 6. However, it is also possible, as shown in FIG. 6 or 7, to fix the amplitude of the triangular wave T output from the oscillator circuit 4 and instead control the gain of the hole amplifier 1 or of the signal synthesizer circuit 2 with the signal output from the current detector circuit 6 and thereby control the amplitude of the drive signals D1, D2, and D3 output from the signal synthesizer circuit 2.

What is claimed is:

1. A motor drive device comprising:

means for producing a pulse signal having a fixed amplitude by comparing a drive signal that is a sinusoidal signal synchronous with rotation of a motor with a predetermined high-frequency signal, wherein switching of a switching device connected between a power source and the motor is controlled by the pulse signal;

means for controlling an amplitude of the high-frequency signal according to a current specifying signal that indicates a level of current to the passed through the motor; and means for exercising control so that the amplitude of the high-frequency signal does not become smaller than an amplitude of the drive signal.

2. A motor drive device comprising:

means for producing a pulse signal having a fixed amplitude by comparing a drive signal that is a sinusoidal signal synchronous with rotation of a motor with a predetermined high-frequency signal, wherein switching of a switching device connected between a power source and the motor is controlled by the pulse signal;

a hole amplifier for amplifying a hole signal output from a hole device fitted around a rotor constituting a rotary position of the motor;

a signal synthesizer circuit for producing the drive signal on a basis of the hole signal amplified by the hole amplifier;

means for controlling a gain of the hole amplifier or of the signal synthesizer circuit according to a current amplifying signal that indicates a level of current to be passed through the motor; and means for exercising control so that the amplitude of the high-frequency signal does not become smaller than an amplitude of the drive signal.

3. A motor drive device comprising:

a hole amplifier for amplifying a hole signal output from a hole device fitted around a rotor constituting a rotary portion of a motor;

a signal synthesizer circuit for producing a drive signal that is a sinusoidal signal synchronous with rotation of the motor on a basis of the hole signal amplified by the hole amplifier;

an oscillator circuit for producing a high-frequency signal having a sufficiently high frequency relative to a frequency of the drive signal;

a comparator for comparing a level of the drive signal with a level of the high-frequency signal;

a switching device connected between a power source and the motor and turned on or off by a signal output from the comparator means for detecting an error in a level of current flowing through the motor from a specified level and controlling an amplitude of the high-frequency signal or of the drive signal according to the detected error; and means for exercising control so that the amplitude of the high-frequency signal does not become smaller than the amplitude of the drive signal.

* * * * *